United States Patent [19]

Morris

[11] Patent Number: 5,256,375
[45] Date of Patent: Oct. 26, 1993

[54] MIXING DEVICE

[75] Inventor: Keith Morris, Wantage, United Kingdom

[73] Assignee: United Kingdom Atomic Energy Authority, Didcot, England

[21] Appl. No.: 671,938

[22] Filed: Mar. 19, 1991

[30] Foreign Application Priority Data

Apr. 6, 1990 [GB] United Kingdom ............... 9007896

[51] Int. Cl.⁵ .......................... B01F 5/06; F17D 3/12
[52] U.S. Cl. ................................ 422/101; 422/99; 422/103; 239/429; 239/430
[58] Field of Search .................. 422/101, 103, 99; 48/189.4, 180.1; 239/429, 430, 431, 432, 433, 434, 434.5

[56] References Cited

U.S. PATENT DOCUMENTS

| 2,305,796 | 12/1942 | Seidel | 261/122 |
| 2,498,190 | 2/1950 | Weeks | 48/189.4 |
| 2,789,867 | 4/1957 | Bloom et al. | 239/431 |
| 2,843,067 | 7/1958 | Dugan | 111/7 |
| 3,680,781 | 8/1972 | Lincoln | 239/431 |
| 3,818,938 | 6/1974 | Carson | 137/604 |
| 4,072,470 | 2/1978 | Tsuto et al. | 23/284 |
| 4,117,550 | 9/1978 | Folland | 366/136 |
| 4,212,835 | 7/1980 | Koros | 261/116 |
| 4,230,278 | 10/1980 | Reed | 239/427.5 |
| 4,295,458 | 10/1981 | Pellerin | 123/590 |
| 4,313,827 | 2/1982 | Ratigan et al. | 210/136 |
| 4,869,595 | 9/1989 | Lang | 366/137 |
| 5,025,989 | 6/1991 | Spink et al. | 239/431 |

Primary Examiner—James C. Housel
Assistant Examiner—Long V. Le
Attorney, Agent, or Firm—William R. Hinds

[57] ABSTRACT

A mixing device for use in a duct (12), particularly for use when testing the efficiency of a filter (10) in the duct by aerosol injection, consists of a pipe (24) with a closed end arranged near the middle of the duct (12). The other end of the pipe is connected to a source (26) of compressed air. Near the closed end are one or more narrow holes (28) so that narrow air jets are created across the width of the duct. The air jets create large-scale turbulence in air flowing in the duct, even where that air flow was already turbulent, such that thorough mixing is achieved within as little as two duct diameters or less, while producing negligible pressure drop. The mixing device may be combined with an aerosol injector (20, 22).

10 Claims, 2 Drawing Sheets

MIXING DEVICE

This invention relates to a mixing device suitable for distributing an aerosol into a gas flow in a duct.

High efficiency particulate air (HEPA) filters are well known for removing particulates from an air or gas stream, and such filters are installed in extract ducts from, for example, shielded cells in which work is carried out on radioactive components. It is necessary to test such filters to ensure that they comply with the requirement to filter out 99.95% of particles in for example the standard sodium chloride test (BS 3928). The most penetrating particle size lies in the range 0.1 to 0.3 microns so that when testing a filter, particle sizes within or very close to this range should be used. When testing in situ it is important to ensure that the test aerosol provides a uniform challenge to the whole of the filter face, which may be defined in practical terms as requiring the aerosol concentration to vary by not more than +/−10% across the entire area of the duct. It is known that if an aerosol is injected into a duct through a single point injector, a uniform aerosol concentration will only be achieved after a duct length at least 30 times the duct diameter even though the gas flow in the duct is turbulent, so the injector must be arranged at least 30 duct-diameters upstream of the filter. This length can be reduced to about 10 duct-diameters by installing a Stairmand disc (i.e. a disc of area half that of the duct, supported centrally within the duct) 0.6 duct-diameters downstream of the injector, although this introduces a pressure drop.

According to the present invention there is provided a mixing device comprising a pipe closed at one end and installed with the closed end within a duct carrying a turbulent flow of a gas and defining near the closed end one or more holes of width between 0.1 mm and 2.0 mm around the pipe, the open end of the pipe being connected to a source of the same gas at high pressure such as to create in operation a gas jet emerging through each hole so as to increase the scale of turbulence in the gas in the duct and so to enhance mixing of the gas flowing along the duct, the size and number of the holes and the pressure of the source being such that the flow rate of the gas through the jets is substantially less than the flow rate of the gas along the duct, in combination with an aerosol injector means comprising an aerosol generator and a tube to supply the aerosol from the generator to the duct, the closed end of the gas pipe being aligned coaxially with the end of the aerosol supply tube remote from the generator.

In use the pipe is arranged with the closed end near the centre of the duct and such that the hole or holes are downstream of the aerosol injector means. There might be one or more slot-shaped holes around the pipe. However the number of holes is preferably between twenty and a hundred, more preferably between thirty and sixty, for example forty-eight, the holes being circular and spaced around the pipe. The holes might be on a helical line around the pipe, or on a circular line. In a preferred embodiment there are two circular lines each of twenty-four equally spaced holes of diameter 0.8 mm, the two lines being 1.0 mm apart axially. The holes might be such that the emerging gas jets diverge radially from the pipe, or adjacent holes might be inclined so the emerging gas jets are in intersecting directions.

Preferably the pipe is connected to a source of compressed air of pressure at least 135 kPa (20 psi), preferably between 200 and 350 kPa and possibly up to about 810 kPa (120 psi). Generally it is preferable to use a higher gas pressure the smaller the width of the holes; however the use of higher gas pressure increases the volume of injected gas and hence, if there is little gas flow along the duct, can significantly dilute the concentration of the test aerosol. The mixing device can reduce the duct length required for thorough mixing to as little as two diameters, so greatly reducing the length of duct needed when testing a filter. It introduces a negligible pressure drop, and typically the volume of air introduced by the mixing device is negligible in comparison with the rate of air flow along the duct.

Preferably the holes in the pipe are between 2 mm and 20 mm, most desirably between 3 mm and 8 mm, for example about 4 mm downstream of the open end of the aerosol supply tube. In this case the gas jets in operation tend to reduce the gas pressure near the open end of the aerosol supply tube and so increase the flow rate of aerosol into the duct. This phenomenon may be enhanced by providing a trumpet-bell shaped end portion to the open end of the aerosol supply tube.

BRIEF DESCRIPTION OF THE DRAWINGS

The invention will now be further described by way of example only and with reference to the accompanying drawings, in which.

DETAILED DESCRIPTION

Figure 1:
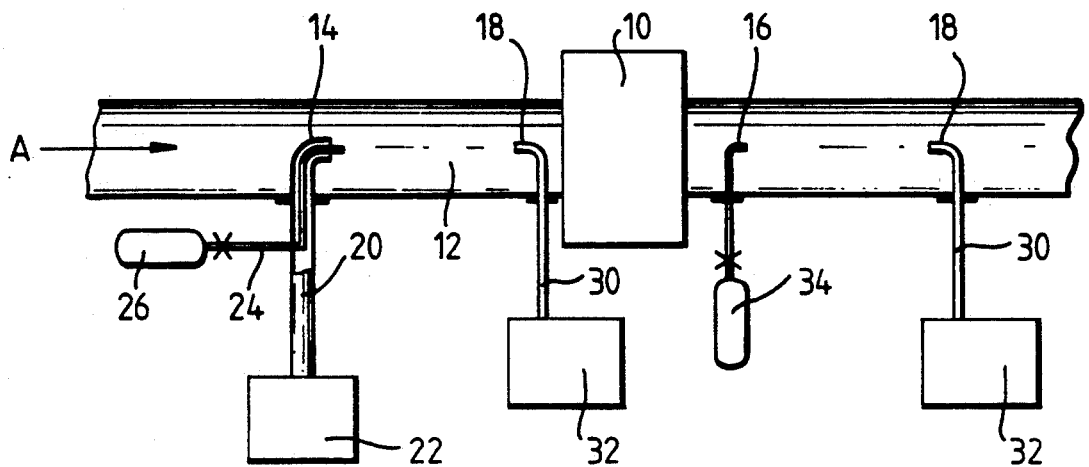
FIG. 1 shows a diagrammatic side view, partly in section, of an apparatus for testing HEPA filters in situ.

Referring to FIG. 1, a HEPA filter 10 is shown installed in a duct 12 of circular cross-section and of diameter 0.6 m, which carries an air flow of 1.8 m$^3$/s in the direction of arrow A. In order to test the efficiency of the filter 10 an aerosol injector and mixer unit 14 is inserted through a port in the wall of the duct 12 a distance of 1.3 m upstream of the filter 10, a mixer unit 16 is inserted through a port downstream of the filter 10, and probe units 18 are inserted through two ports, one 50 mm upstream of the filter 10 and the other 1.2 m downstream of the mixer unit 16. The units 14, 16 and 18 may be permanently installed, or may be installed through ports which are blanked off during normal operation of the duct 12 and the filter 10.

The unit 14 comprises an open-ended tube 20 of diameter 28 mm connected to a conventional generator 22 of di-octyl phthalate test aerosol (DOP), the tube 20 being installed so that its mouth is in the middle of the duct 12 facing downstream. A pipe 24 of diameter 15 mm connected to a compressed air supply 26 is arranged so its end portion extends coaxially within the open end of the tube 20 and protrudes from it.

Figure 2:
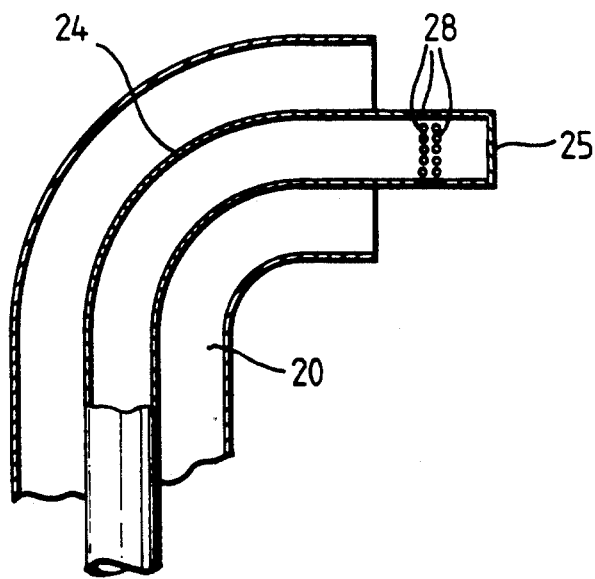
FIG. 2 shows, to a larger scale, the injector/mixer unit of FIG. 1.

Referring now to FIG. 2, this shows to a larger scale the ends of the tube 20 and the pipe 24 within the duct 12. The end 25 of the pipe 24 is closed. Near the closed end 25 and about 4 mm downstream of the mouth of the tube 20 there are forty-eight 0.8 mm diameter holes 28 through the wall of the pipe 24 arranged in two circular lines around the circumference of the pipe 24; within each circle the holes 28 are evenly spaced, and the holes 28 of the two circles are 1 mm apart at their closest (i.e. their centres are 1.8 mm apart). In this embodiment the holes 28 all extend radially through the pipe wall.

In operation of the unit 14 the generator 22 (which might be a thermal generator or a compressed air generator) creates DOP aerosol which emerges into the air flow in the duct 12 through the tube 20. The Reynolds number for the air flow is about 250,000 so that the air flow is turbulent, but the scale of the turbulence is such that it would require a duct length of about thirty duct-diameters before the aerosol was distributed uniformly across the entire width of the duct 12. Supplying compressed air to the pipe 24 at a pressure of 200 kPa (30 psi) creates forty-eight narrow radial jets of air across the duct 12. This considerably increases the scale of the turbulence in the air flow in the duct 12, such that the DOP aerosol is distributed uniformly across the duct 12 within four duct diameters. The proximity of the air jets to the mouth of the tube 20 also tends to suck aerosol along the tube 20 and so to increase the rate of injection of aerosol into the duct 12.

Referring again to FIG. 1, the two probe units 18 enable the concentration of DOP aerosol to be measured upstream and downstream of the filter 10, and each probe unit 18 consists of an open-ended tube 30 of diameter 10 mm connected to a photometer 32. The tube 30 only samples the air flow through a small part of the duct 12. To ensure that any leaking DOP aerosol is distributed uniformly across the duct 12 (and hence to prevent it being missed by the downstream probe unit 18) the mixer unit 16 is provided. This is substantially identical to the tube 24 described above, and is connected to a source of compressed air 34; consequently it too creates forty-eight narrow radial jets of air across the duct 12, thoroughly mixing the air in the duct 12 within four duct diameters.

Figure 3:
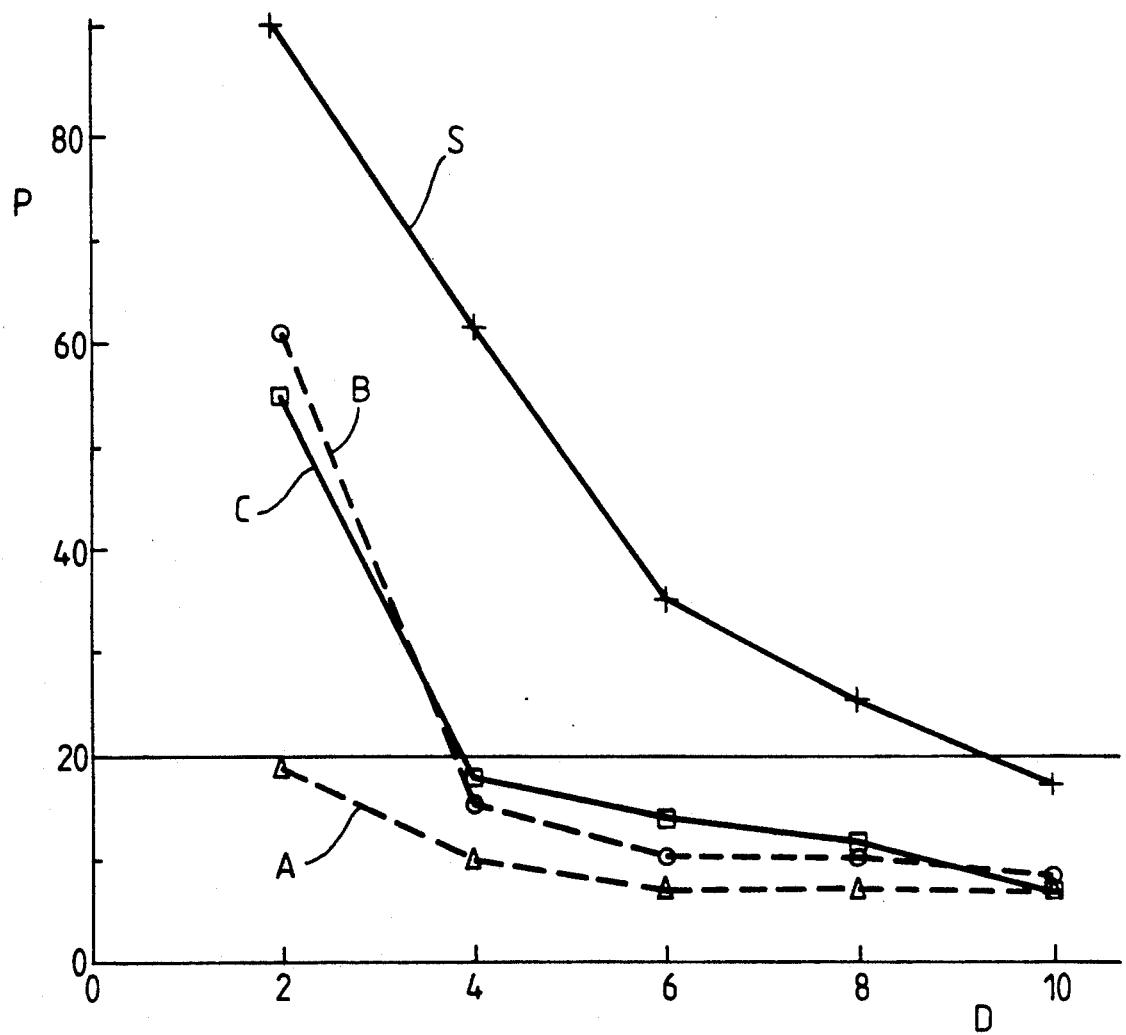
FIG. 3 represents graphically variations in the degree of mixing under different circumstances.

The duct length within which thorough mixing takes place depends on the size of the duct and on the gas flow along it, the necessary duct length increasing as the flow velocity increases. FIG. 3, to which reference is now made, shows graphically how the percentage variation in aerosol concentration (P) across the duct changes with distance downstream of an aerosol injector and mixer unit 14 as described above, the distance being expressed as a multiple (D) of the duct diameter. A value of P less than twenty per cent is taken as indicating thorough mixing, as this corresponds to a variation of $+/-10\%$ across the duct. Experimentally measured value of P are shown for a circular duct of diameter 150 mm for flow velocities of 13 m/s (graph A) and 26 m/s (graph B) (corresponding to flows of 0.22 and 0.44 m$^3$/s); for the lower flow rate thorough mixing is achieved within two duct diameters, while for the higher flow rate it is achieved within four duct diameters. Experimentally measured values of P are also shown for a circular duct of diameter 350 mm at a flow velocity 10 m/s (graph C) (corresponding to a flow of 0.94 m$^3$/s), for which thorough mixing is achieved within four duct diameters. Graph C may be compared to that obtained in the same duct using a Stairmand disc as the mixing device (graph S), for which the necessary duct length is more than doubled; the disc also introduces a pressure drop of about 220 Pa, compared to only about 30 Pa created by the injector and mixer unit 14.

It will be appreciated that a mixer unit may differ from those described above while remaining within the scope of the invention. For example the size and shape of the holes through which the air jets emerge might differ, as too might their arrangement and their orientation. Preferably the holes are of diameter between 0.6 and 1.0 mm; where they lie on two circumferential circular lines, as described above, those lines are preferably no more than 3.0 mm apart. Where, as in unit 14, the mixer is combined with an aerosol tube, the distance between the air jets and the mouth of the tube might differ from the value of 4 mm described above, although for larger distances the sucking effect will be less or non-existent.

I claim:

1. A mixing device comprising a pipe closed at one end and installed with the closed end within a duct carrying a turbulent flow of a gas and defining near the closed end one or more holes of width between 0.1 mm and 2.0 mm around the pipe, the open end of the pipe being connected to a source of the same gas at high pressure such as to create in operation a gas jet emerging through each hole so as to increase the scale of turbulence in the gas in the duct and so to enhance mixing of the gas flowing along the duct, the size and number of the holes and the pressure of the source being such that the flow rate of the gas through the jets is substantially less than the flow rate of the gas along the duct, in combination with an aerosol injector means comprising an aerosol generator and a tube to supply the aerosol from the generator to the duct, the closed end of the gas pipe being aligned coaxially with the end of the aerosol supply tube remote from the generator.

2. A mixing device as claimed in claim 1 wherein each hole is slot-shaped.

3. A mixing device as claimed in claim 1 wherein the number of holes is between twenty and a hundred, the holes being substantially equally spaced around the pipe.

4. A mixing device as claimed in claim 3 wherein the number of holes is between thirty and sixty.

5. A mixing device as claimed in claim 3 wherein the holes lie on one or more circumferential circular lines around the wall of the pipe.

6. A mixing device as claimed in claim 1 wherein the holes are oriented such that the emerging gas jets propagate in substantially radial directions.

7. A mixing device as claimed in claim 1, the source of gas at high pressure being at a pressure of at least 135 kPa.

8. A mixing device as claimed in claim 1 wherein the holes in the gas pipe are between 2 mm and 20 mm downstream of said end of the aerosol supply tube.

9. A mixing device as claimed in claim 8 wherein the holes in the gas pipe are between 3 mm and 8 mm downstream of the said end of aerosol supply tube.

10. A mixing device comprising a pipe closed at one end and installed with the closed end within a duct carrying a turbulent flow of a gas, a source of the same gas at a high pressure of at least 135 kPa connected to the other end of the pipe, the pipe defining near the closed end thereof between thirty and sixty circular holes of diameter between 0.6 and 1.0 mm, the holes being arranged along two circumferential circular lines separated by an axial distance no more than 3.0 mm, and the holes being oriented such that in operation gas jets emerge through the holes propagating in substantially radial directions so that the jets increase the scale of turbulence in the gas in the duct and so enhance mixing of the gas flowing along the duct, the flow rate of the gas through the jets being substantially less than the flow rate of the gas along the duct, in combination with an aerosol injector means comprising an aerosol generator and a tube to supply the aerosol from the generator to the duct, the closed end of the gas pipe being aligned coaxially with the end of the aerosol supply tube remote from the generator.

* * * * *